Nov. 5, 1968    J. W. COLE ET AL    3,408,773
GRINDING MACHINES

Filed May 12, 1966    3 Sheets-Sheet 1

INVENTORS.
JOHN WILLIAM COLE
ERIC MENZER JR.
BY

Samuel Frank Walker
ATTORNEY

Nov. 5, 1968   J. W. COLE ET AL   3,408,773
GRINDING MACHINES

Filed May 12, 1966   3 Sheets-Sheet 2

INVENTORS.
JOHN WILLIAM COLE
ERIC MENZER JR.
BY
Samuel Branch Walker
ATTORNEY

INVENTORS.
JOHN WILLIAM COLE
ERIC MENZER JR.
BY

ATTORNEY

United States Patent Office 3,408,773
Patented Nov. 5, 1968

3,408,773
GRINDING MACHINES
John William Cole, Georgetown, and Eric Menzer, Jr., Danbury, Conn., assignors to American Cyanamid Company, Stamford, Conn., a corporation of Maine
Filed May 12, 1966, Ser. No. 549,513
4 Claims. (Cl. 51—103)

ABSTRACT OF THE DISCLOSURE

Long soft strands, such as surgical sutures are ground to size in a centerless grinding machine using a cylindrical grinding wheel, and a frustoconical to hyperboloid of revolution shaped regulating wheel, having an offset angle of about 10° to about 60° and a feed angle of about 5° to about 15°, with respect to the grinding wheel, forming a tapered grinding throat, with an exit diameter of finished strand size, and which regulating wheel has essentially rolling contact with the strand all along the throat, avoiding internal twisting of the strand.

---

This invention relates to an apparatus for the rapid precision centerless grinding of long soft strands, and more particularly to a grinding machine for surgical sutures and the like having a regulating wheel which is tapered so as to minimize twist in the part of the workpiece being ground.

Centerless grinding machines are extensively used in mass production operations. They are particularly convenient because they eliminate the time and work required in loading, centering and changing from one workpiece to the next such as required with a center type grinder. Such machines have been adapted to grinding of lengths of soft materials including surgical sutures. In centerless grinding the workpiece to be ground is rotated about its axis between a grinding wheel and a regulating wheel. The cutting pressure of the grinding wheel keeps the workpiece in contact with a workrest support and the regulating wheel. Rotation of the regulating wheel causes the workpiece to rotate at a peripheral speed which is essentially the same as that of the regulating wheel, and depending upon the relative diameters a proportionate angular velocity, i.e., speed of rotation. The regulating wheel has been tilted with respect to the grinding wheel so as to move the workpiece from the feed end to the discharge end of the grinding machine. The magnitude of this angle controls the speed with which the workpiece is moved through the grinding machine.

In standard centerless grinding machines the surfaces of both the regulating wheel and the grinding wheel are cylindrical. The regulating wheel is at a slight angle to the grinding wheel so that the throat, or space between the two wheels, is tapered to reduce the size of the workpiece as it is fed through between the grinding wheel and the regulating wheel. One such machine is shown in U.S. 2,355,907, W. A. Cox, Method and Apparatus for Grinding and Polishing Ligatures, Aug. 15, 1944.

A grinding machine in which the grinding wheels revolve around the suture is shown in U.S. 2,918,759, Konazewski and Bott, Planetary Driven Linear Suture Grinder, Dec. 29, 1959. Machines in which the grinding surfaces travel in the direction of the axis of the suture but in which the suture is rapidly rotated about its own axis to give a uniform spiral are shown in U.S. Patent 3,066,452, Bott and Konazewski, Precision Grinding of Surgical Sutures, and 3,066,673, Bott and Konazewski, Surgical Sutures, both dated Dec. 4, 1962.

In the past workpieces have been ground either slightly above, on, or slightly below the line of centers of the regulating and grinding wheel.

Among the problems associated with conventional machines is the torque or twist induced in a soft workpiece such as a suture as the suture is reduced in size. Where the grinding wheel and the regulating wheel were both cylindrical, the grinding action of the grinding wheel abrades material from the suture at any part of the throat where the suture is of such size as to more than fill the width of the throat. The suture rolls, and is turned by the regulating wheel. Where the regulating wheel is of uniform diameter, the suture must slip on at least part of the line of contact, and may slip non-uniformly resulting in non-uniformity of grinding. Difficulty has also been encountered in starting the grind where the suture has been fed axially and without rotation into the throat between the grinding and regulating wheels, and the entire suture must be brought up to speed by contact with the regulating wheel. While the suture is accelerating angularly, grinding tends to become non-uniform.

We have now found that more uniform and successful grinding results from first, spinning the suture about its own axis before it is fed into the grinding throat so that the initial stresses of bringing the suture up to such speed that it has rolling contact with the regulating wheel are minimized; and secondly the regulating wheel has an essentially conical configuration whereby the generated cone of surface of the suture in the throat is in essentially rolling contact with the regulating wheel at all points between the feed and the discharge ends of the grinding throat.

Use of a tapered regulating wheel is also advantageous with other soft material such as plastic which is relatively soft and which may be ground to size independent of the length of the workpieces; and is even advantageous with hard workpieces such as metal where it is desired to have grinding contact only with the grinding wheel and rolling contact throughout with the regulating wheel to give a more uniformly finished surface. Slippage is minimized between the workpiece and the regulating wheel.

For purposes of description, the axis of the grinding wheel is considered as horizontal, the grinding wheel cylindrical, and the direction of the axis of the grinding wheel is taken as the axis from which other angles and positions are measured. In use it is to be understood that the axis of the grinding wheel may be shifted with accompanying shifts in the other components, so that the same relative positional relationships are maintained. The plane containing the axis of the grinding wheel and the grinding throat is considered as a horizontal surface. Viewed perpendicularly to this surface, the angle between the axis of the grinding wheel and the regulating wheel is called the "offset angle," although it also may be called the horizontal angle, or by analogy to geodesic conventions, called the azimuth angle. The angle in a vertical plane that the axis of the regulating wheel makes with the horizontal plane is called the "feed angle" although it may also be referred to as the run angle or the vertical angle, or by analogy, the angle of elevation.

The surface of the regulating wheel is geometrically more complex. If the workpiece in grinding throat be considered as slightly conical, and the axis of this cone is horizontal, converging slightly towards the grinding wheel, the contact between the theoretical edge of the grinding throat and the regulating wheel is a horizontal line and hence is at an angle to the axis of the grinding wheel. If the surface of the regulating wheel be considered as a true cone a conic section is cut, and forms the line of contact. If the cutting plane of a cone is at a greater angle to the axis of the cone than an element of the cone, by definition an ellipse is cut. If the angles are the same, by definition a parabola. If the angle is less, by definition a hyperbola. Because the thickness of the regulating wheel is fairly small as compared with the size of the cone the differences between these geometrical figures is slight. The surface generated by a straight line revolving around an axis, which is not intersected by the generating line, is a hyperboloid of revolution. If the generating line is not too far from intersecting, and a small slice is taken at right angles to the axis of revolution, the surface is curved but at first impression looks rather much like the frustum of a cone depending upon the amount of curvature in the hyperboloid of revolution at the sections where the slice is taken.

In the present device, if the regulating wheel is dressed as for example using a diamond point which point is moved in a line which intersects the axis of the regulating wheel, a true cone is generated and the intersection between this true cone and the workpiece being ground is a conic section. If on the other hand a dressing point is used which moves parallel to the axis of the grinding wheel, the edge of the throat appears as a straight line and the actual surface of the regulating wheel is a hyperboloid of revolution. The angle of dressing may be anywhere between a line which intersects the axis of the grinding wheel and a line which is in the same plane as the grinding wheel and throat and is best described by the hyperboloid of revolution above mentioned. In practice it is frequently found advantageous to use a dressing line that is somewhat between the above so that the dressing line makes an angle of a few degrees less, with the axis of the regulating wheel than does the grinding wheel. This in effect causes the ground surface to possess certain of the attributes of a hyperboloid of revolution also. The suture itself is somewhat flexible and if the cutting feed into the grinding wheel is somewhat greater where the suture first enters the grinding throat, and somewhat less where it comes out of the grinding throat, as is accomplished by having the ground suture follow somewhat of the configuration of a hyperboloid of revolution, as happens when the grinding wheel is cylindrical, and the regulating wheel is a hyperboloid of revolution whose generating line has an angle which is slightly less than the angle which the axis of the grinding wheel makes with the cone measured as the run angle. The reduced grinding rate at the exit of the throat and parts adjacent thereto results in more rapid grinding near the entrance and a reduced rate near the exit and hence smoother operation than would a uniform convergence in the grinding throat.

While the geometrical treatment of the grinding operation is comparatively involved as contrasted with prior art devices, the usefulness and conveniences is much greater and a higher production of satisfactory sutures is obtained than has been previously feasible.

The rotation of the suture before it enters the grinding throat gives a smoother feed entry and reduces the initial shock as the suture is brought up to speed which also is conducive towards improved grinding results. It is found that by using the preferred configuration as above mentioned, that the tendency of the ground suture to form a three lobed figure is reduced and the sutures are of circular cross section as well as uniform diameter.

Our invention is further illustrated in the accompanying figures and following detailed description of one particular embodiment from which additional advantages and unobvious attributes are apparent.

In the figures:

FIGURE 7 is a close up view of the grinding and regulating wheels and grinding throat, and shows the coolant liquid spray and washoff jets.

FIGURE 8 is a much enlarged view showing a three-lobed constant diameter figure as contrasted with a circular cross section for a suture.

Grinding wheels

Figures 1, 2:
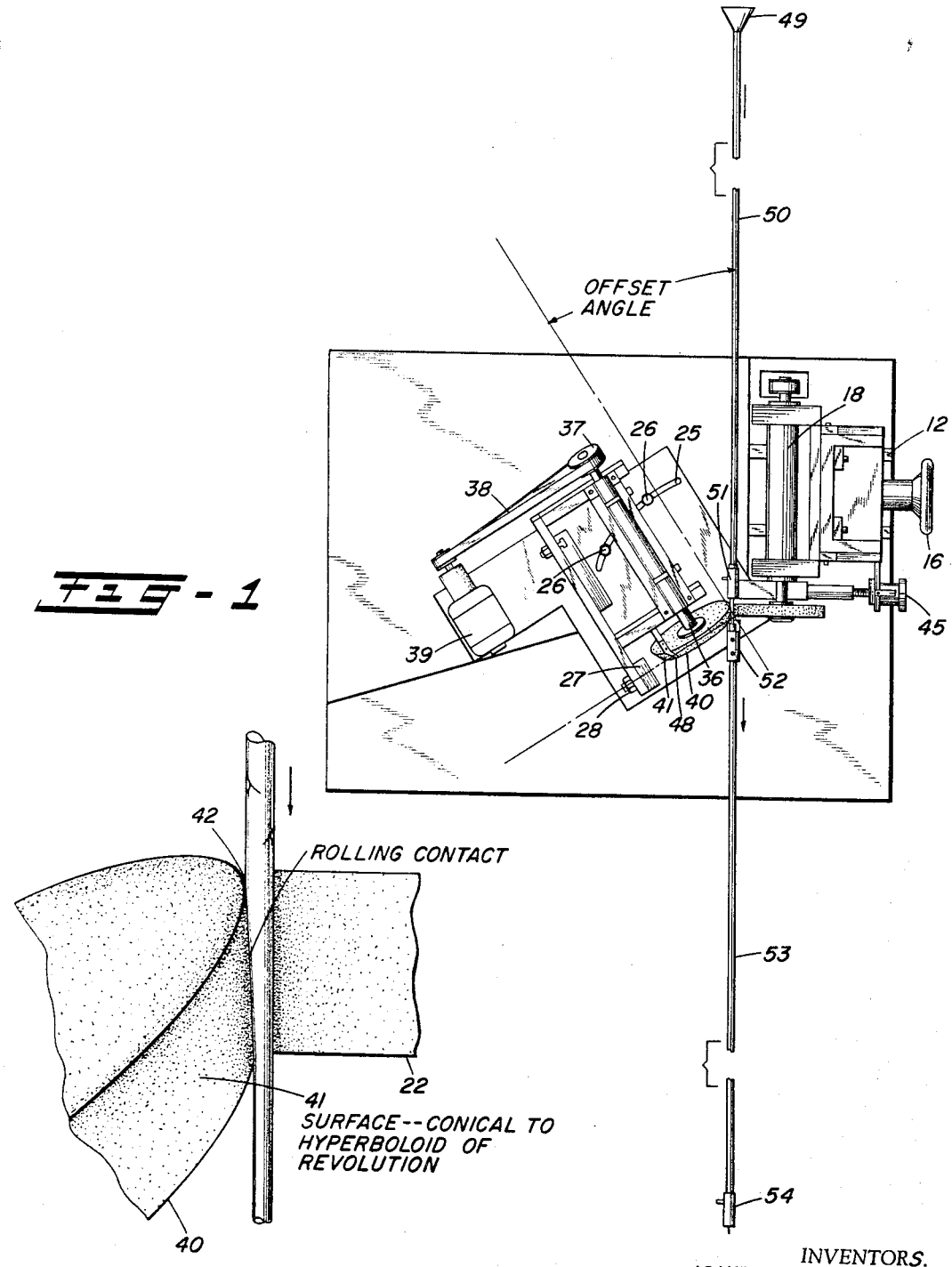
FIGURE 1 is the top view of the grinding machine.
FIGURE 2 is an enlarged view of the grinding and regulating wheels, in contact with a suture.
Figure 3:
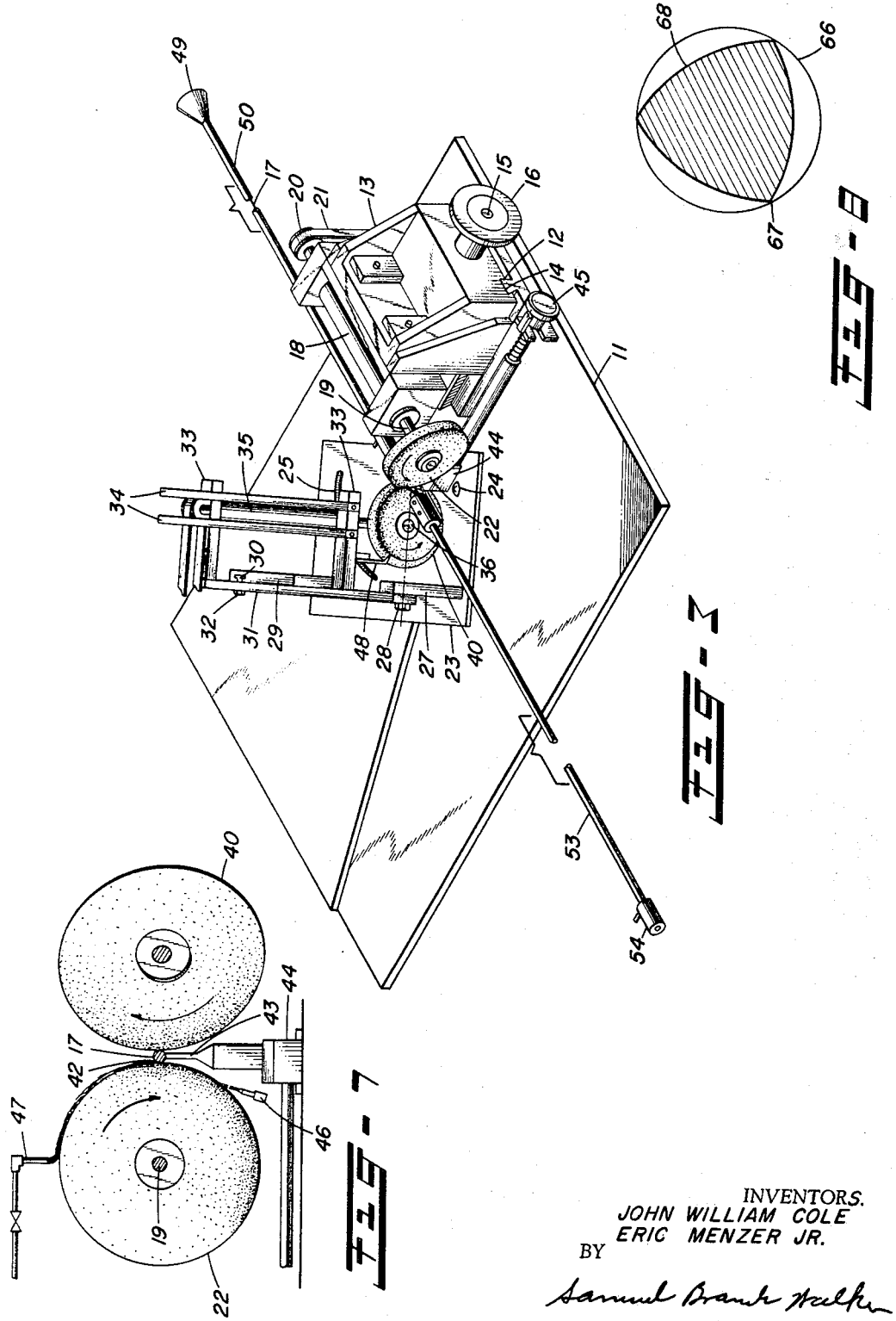
FIGURE 3 is a perspective view of the assembly.

As shown in FIGURES 1 and 3 the suture grinding assembly is primarily mounted on a support table 11. Attached to this support table is a grinding wheel dovetail 12. Above and sliding on the grinding wheel dovetail is the grinding wheel bracket 13. In the lower portion of the grinding wheel bracket are the grinding wheel dovetail ways 14. The position of the grinding wheel bracket on the grinding wheel dovetail is controlled by a grinding wheel adjusting screw 15 which in turn is turned and controlled by a grinding wheel adjusting wheel 16. The grinding wheel bracket is spring loaded to press the grinding wheel away from the suture being ground 17 and the grinding wheel bracket is being forced towards the suture by the grinding wheel adjusting screw 15. On the grinding wheel bracket and, essentially parallel to the suture is fastened a grinding wheel spindle 18. In the grinding wheel spindle is mounted the grinding wheel shaft 19, on one end of which is the grinding wheel drive pulley 20, on which is the grinding wheel drive belt 21. Conveniently the grinding wheel drive belt 20 is driven by a motor, not shown, mounted below the support frame.

This much of the grinding wheel assembly is conventional and may in fact be part of the grinding wheel assembly shown in U.S. 3,066,673, supra. In accordance with conventional machine shop practice, the ways are smooth, preferably lapped, and the adjusting screw is so controlled that the position of the grinding spindle may be accurately controlled and the assembly slides smoothly on the ways. The grinding wheel shaft 19 is preferably journaled in ball or roller bearings so that it may rotate at high speed with a minimum of friction and a minimum of free play. On the end of the grinding wheel shaft 19 opposite to the grinding wheel drive pulley is mounted the grinding wheel 22. For surgical sutures, this grinding wheel 22 may be a conventional grinding wheel of plastic or ceramic bonded grits or other ceramic grinding material. Ceramic bonded grinding wheels which are somewhat porous are usually preferred to prevent loading of the wheel. A wheel of from 100 to 150 mesh grit gives good results. Such a wheel may be readily dressed with a diamond dresser and cuts at a very satisfactory rate. As the suture itself is much softer than the wheel, and as compared with metal grinding practice, wears at a much slower rate, the grinding wheel may in production require dressing only at comparatively long intervals say once a week to once a month. This is spectacular life for a grinding wheel. Without being limited thereto, 4″ to 16″ diameter grinding wheels gives good results. The wheel is driven at a surface speed of around 6,000 to 6,500 feet per minute. The drive speed of the grinding wheel may be higher if grinding wheels rated at such speeds by the manufacturer are available. Usually the manufacturer prefers to limit the surface speed of the wheel to around 6,000 to 6,500 feet per minute to insure that the wheel will not blow up from centrifugal forces. Slower grinding speeds may be used but a slower surface speed on the grinding wheel, of course, gives grinding at a slower rate with a proportionately lower capacity for the grinding machine.

Regulating wheel assembly

On the support table is a regulating wheel frame 23 which is pivoted on a regulating wheel frame pivot 24. This pivot is under the discharge end of the suture, and perpendicular so that the regulating wheel frame pivots about a line tangent to the discharge face of the grinding wheel on a line substantially perpendicular to the plane formed by the discharge point of the grinding wheel and the grinding wheel axis. The regulating wheel frame has a radial slot 25 therein through which clamp bolts 26 pass which clamp the regulating wheel frame to the support table in a chosen angular position to control the offset angle. Attached to the regulating wheel frame is a front regulating wheel post 27 having a regulating wheel pivot bolt 28 mounted therein. The center line of the regulating wheel pivot bolt passes through the exit point on the grinding throat 42 later described. Also mounted on the regulating wheel frame 23 is a rear regulating wheel post 29 having therein a T slot 30 which is a radial slot concentric with the regulating wheel pivot bolt 28. A regulating wheel bracket is rotatably mounted on the regulating wheel pivot bolt 28 and is angularly positioned to control the run angle by a regulating wheel bracket clamp bolt 32. On the regulating wheel bracket 31 are the regulating wheel bracket legs 33, which are attached to the regulating bracket and are essentially parallel with the regulating wheel pivot bolt center line. Mounted on these bracket legs are the regulating wheel support plates 34. Attached to the regulating wheel support plates is the regulating wheel spindle 35. Journaled in the regulating wheel spindle is the regulating wheel shaft 36. On the rear end of the regulating wheel shaft is the regulating wheel drive pulley 37 driven by a regulating wheel belt 38 from a regulating wheel motor 39. On the other end of the regulating wheel shaft is the regulating wheel 40. The regulating wheel motor preferably has a reduction gear on it and a speed control so that the regulating wheel can be driven at any desired speed from around 50 revolutions per minute for the slow feeding of very small sutures up to about 2,000 or more revolutions per minute for dressing for the regulating wheel.

The regulating wheel has a conical face 41. The face is referred to as conical for purposes of convenience even though it has certain aspects of a hyperboloid of revolution; as the actual deviation from a true frustoconical surface is too small to be observed without careful study.

This support system permits the offset angle and run angle of the regulating wheel to be adjusted as desired. It is convenient to have an angular adjustment built into the machine that will allow around 10° to around 60° of offset angle depending upon the size of the suture to be ground. Similarly, the feed angle, or the inclination of the regulating wheel can be controlled over a range adequate to secure the feed rate desired. A feed angle of about 5° to about 15° is desirable depending upon the desired feed rate of the suture which in turn depends at least in part on the size of the suture.

The regulating wheel is adjustable laterally for positioning towards or away from its closest point of conversion with the grinding wheel. The closest parts of the regulating wheel 40 and the grinding wheel 22 form a grinding throat 42.

As shown in FIGURE 7, at the bottom of the grinding throat is a work support blade 43 which is of such size that it will fit into the gap between the grinding wheel and the regulating wheel and support the suture along the desired grinding path. For very small sutures the blade is quite thin and is accurately positioned on a work support holder 44 to prevent its being ground off while in the grinding throat. It is accurately laterally positioned by a work support adjusting screw 45.

Because in grinding sutures a comparatively large amount of suture material may be removed in a fairly short period, the material ground off is preferably washed away. A hydrocarbon such as kerosene may be used, with the washing liquid being recovered. Water can be used and the ground material may be washed into a sewer.

Just beyond the grinding throat on the grinding wheel travel, is a tangential wash spray nozzle 46 which is arranged to spray either a plurality of closely spaced solid streams or a solid sheet of coolant liquid tangentially against the grinding wheel, which washes debris off the grinding wheel face. Above the grinding wheel is a cooling liquid nozzle 47 which sprays coolant liquid at a lower velocity onto the surface of the grinding wheel where it is picked up and carried by the grinding wheel into the grinding throat. Part of the liquid adheres to the surface of the wheel and part of it is directed by the wheel against the suture so as to wash off any particles and to keep the suture cool during the grinding operation.

Adjacent to the regulating wheel 40 is a regulating wheel scraper 48. This is a thin steel scraper which is mounted so as to be close to, without touching the regulating wheel. Conveniently the regulating wheel scraper may be spaced by placing a thin metal spacer—of the order of 0.001 inch in thickness, on the regulating wheel, holding the scraper in position against this spacer and clamping the scraper holding bolts, and then removing the spacer. By following such procedure the scraper has a spacing about a thousandth of an inch and yet is not in contact with the regulating wheel. Any portions of the suture which stick to the regulating wheel are deflected away from the regulating wheel by this scraper so the regulating wheel is free from adherent material.

Sometimes, particularly with the smaller sizes of sutures, if anything goes wrong in the grinding operation the entire suture may in effect be almost instantaneously pulverized with part of it being deflected by the regulating wheel scraper and part of it being washed off of the grinding wheel by liquid from the tangential wash spray nozzle 46 and cooling liquid nozzle 47 so that the suture in effect disappears without clogging the machine. Rather than being considered a loss, this disappearance of the suture is an advantage as sutures which have zones of weaknesses or cracks in them are much more apt to become deflected into the grinding wheel-regulating wheel system and completely destroyed during the grinding operation than is a suture having the requisite characteristics to make a surgically acceptable suture. It is a fortunate and fortuitous accident that defective sutures are in part inspected and rejected by the grinding machine itself during the grinding operation.

*Feed system*

Figure 4:
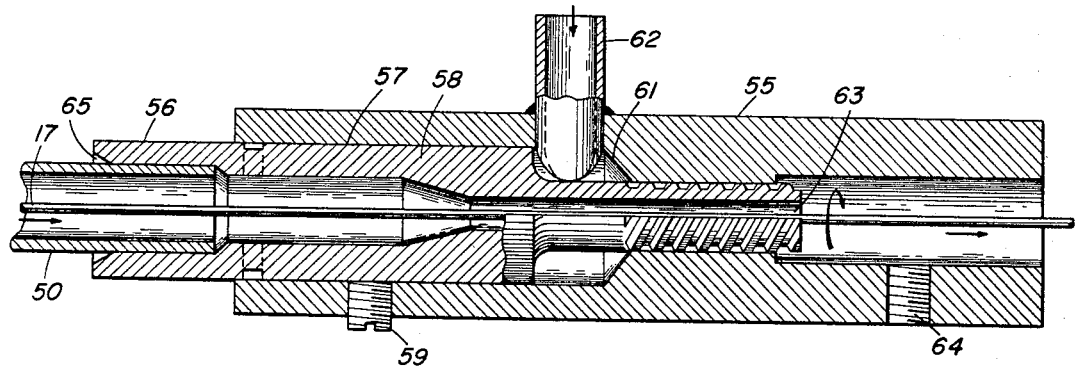
FIGURE 4 is a view in partial section of the infeed ejector.

An individual suture is fed through a funnel mouth 49 into a feed tube 50. The feed tube 50 is a piece of small bore tubing long enough to receive the longest suture or other workpiece which is to be ground. The feed tube is connected to the entrance end of the infeed injector 51 the details of which are shown in FIGURE 4.

Discharge from the infeed injector is very close to the grinding throat and may be one-eighth of an inch or less from the face of the grinding and regulating wheels.

Figure 5:
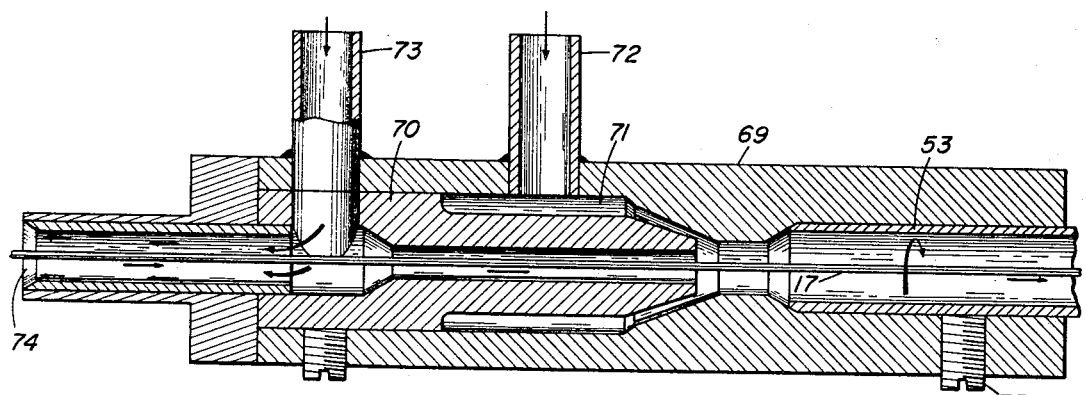
FIGURE 5 is a sectional view of the take-off and drying ejector.
Figure 6:
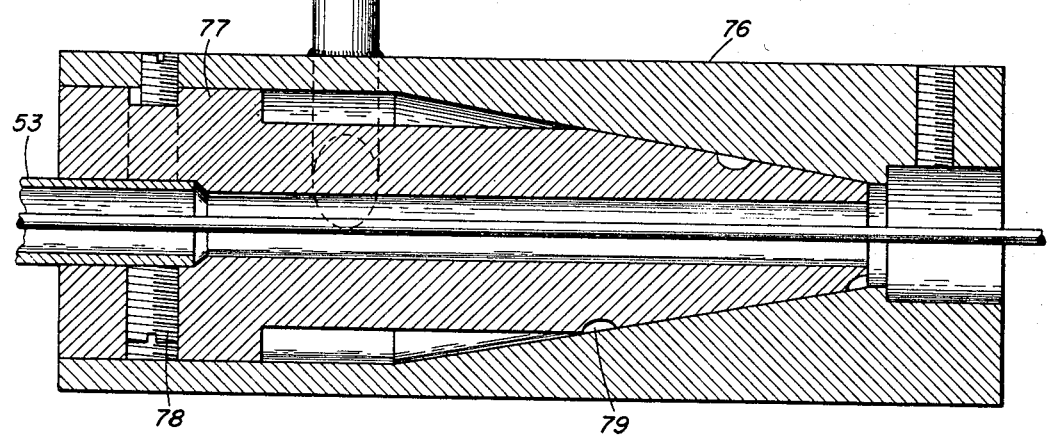
FIGURE 6 is a sectional view of the braking ejector.

After the suture has passed through the grinding throat and been ground to size it passes through the takeoff and drying ejector 52 the details of which are shown in FIGURE 5. As the suture is passed out of the takeoff and drying ejector it passes into a receiving tube 53 which is a small diameter tube longer than the longest suture of workpiece to be ground. The purpose of the receiving tube having such length is so that one suture can be completely released from the grinding throat while still under the influence of the takeoff and drying ejector. At the other end of the receiving tube is a braking ejector 54 which slows the speed of the suture and presents it for passage to the next operation. The details of the braking ejector are shown in FIGURE 6.

In FIGURES 1 and 3 each of the feed tube 50 and the receiving tube 53 are shown as broken away in part, as these tubes are usually so long that to show them to full scale would necessitate the illustration of the remaining parts of the machines on such a small scale that it could not be readily seen or understood. It is to be understood that these tubes are long enough to handle whatever type of workpiece being ground. Sutures are usually not more than 6 feet long. There is no reason why longer workpieces could not be ground, and if sutures or other soft material workpieces having greater lengths are to be ground, suitable length tubes can be selected. A length of about 6 feet is adequate to handle the sutures now being found most acceptable commercially. A suture of appreciably over 5 feet would be too long for a using surgeon to stretch between the forefinger and thumb of his two hands when stretched.

As shown in FIGURE 4, the infeed injector consists of two principal parts, the infeed injector housing 55 and the infeed injector insert 56. The infeed injector housing is bored to receive the infeed injector insert. There is a first chamber 57 in the housing which houses the main body 58 of the infeed injector insert, which is held in place by a set screw 59. The front end of the first chamber tapers down to and receives the threaded end of the infeed injector insert. Between the two is an air chest 61, fed by an air line 62. The outside of the threaded end of the infeed injector insert is shown as threaded with a multiple thread left hand Acme type thread. This is shown as a triple pitch thread. The left hand configuration is desired so that as air is supplied through the air line 62 through the air chest 61, the air escapes through the threads, with a high speed spiralling motion in the left hand direction. As the air is moving at a high speed following Venturi's principle, suction is created and the suture 17 is drawn through the exit chamber 63 of the infeed injector. The housing is slightly enlarged to permit the air to expand as it escapes. A tapped hole 64 provides for a set screw to hold an insert for smaller size sutures. At the upper end of the infeed injector insert 56, the insert has a counterbore 65 to receive the end of the feed tube 50.

In operation the air pressure supplied to the air chest through the air line may be varied to control the relative rate of rotation and the relative rate of feed of the incoming suture. The high rotational speed to the suture is desirable as is the suture is spinning when it enters the grinding throat, so the first shock between the grinding and regulating wheels on the suture does not have to accelerate the entire suture angularly to insure rotation. Such an initial pickup where a marked variation in desired and fed speed may exist, can cause the suture to become undersized or to form a three lobed figure as shown in FIGURE 8.

The three lobed figure shown in FIGURE 8 is a rather anomalous type of a geometrical figure. The outside circle 66 is the outer diameter 66 of a properly sized suture which is circular. It is found in centerless grinding machines that the suture can pivot on an apex 67 and if the suture pivots on the apex rather than on the center there is formed a flat lobe 68 which has its radius the entire diameter of the desired suture. Thus there is in effect formed a three lobed figure which when measured on any diameter comes out to be full sized and yet is sharply undersized because of the difference between the lobe using a diameter as a radius and the true circular form in which the external generating line is a true circle.

At the exit end of the grinding throat and spaced closely to the grinding throat, for example a gap of an eighth of an inch or less is usually adequate, is the takeoff and drying ejector as shown in FIGURE 5. This consists of a takeoff ejector housing 69 which is bored at the upper end to receive the takeoff ejector insert 70. A space between these two provides for the takeoff air chest 71 which is fed by a takeoff air line 72. The inside of the takeoff ejector housing has a constricted portion serving as a Venturi tube with the front portion of the ejector insert acting as a nozzle to give an annular air jet which picks up and carries with it the suture 17. Also through the ejector housing, and cooperating with a slot in the takeoff ejector insert, is a drying air line 73 which feeds back into and blows in the direction opposite to suture travel through the receiving orifice 74 which is slightly funnel shaped to aid in directing the suture centrally thereof. The relative air pressure in the drying air line is much less than in the ejector air line. The takeoff air line or ejector air line has enough pressure to cause the suture to move forward whereas the blowback or drying air line is merely sufficient to blow liquid off the suture and prevent large quantities of liquid being carried with the suture. The suture may not be completely dry but there is not enough sensible moisture remaining to deleteriously interfere with the suture, so that the suture as it is transferred to the next operation, may be considered essentially dry. The receiving tube 53 is held in the exit end of the takeoff ejector housing 69 by a receiving tube set-screw 75. No rotation is imparted to the suture as it passes through the takeoff ejector but the suture is allowed to retain such rotational characteristics as are imparted to it by the action of the regulating wheel. After the trailing end of the suture has cleared the regulating wheel, it very rapidly thereafter clears the takeoff ejector and the suture is then left in the receiving tube from whence it passes to the braking ejector 54.

As shown in FIGURE 6 the brake ejector consists of a brake ejector housing 76 in which fits the brake ejector insert 77. The upper end of the brake ejector insert is counterbored to receive the end of the receiving tube 53 which is held therein by a set-screw 78. The brake ejector insert fits rather closely into the brake ejector housing which has a conical lapped meeting surface in which are 3 start left hand helix constant depth threads 79 which give a left hand twist to the suture as it comes through the braking ejector. The braking ejector has a braking air line 80 leading thereto which supplies air to the three start threads on the brake ejector insert, which gives a low rotational flow of air which prevents the suture from being driven too rapidly forward and instead it is caused to pick up rotational speed and be delivered slowly to the next step in the handling process. Any conventional mechanism may be used to pick up the suture and transfer it from the receiving tube to whatever operation is next.

In operation as a suture to be ground is fed to infeed injector, the suture is spun and introduced into the throat between the regulating wheel and the grinding wheel. The feed injector works very well at about 40 pounds per square inch pressure. The takeoff and drying ejector works very well with 20 to 40 pounds per square inch on the ejector and from 2 to 4 pounds per square inch on the blowback. The braking ejector operates conveniently at from 4 to 6 pounds per square inch. These pressures are given as representative for an average size suture. Higher pressures may be required or lower pressures may be desired depending upon the relative size of the suture and the feed injector and ejector and other operating parameters. In the grinding operation the angle of feed and the speed of the regulating wheel controls the rate of suture advance. A regulating wheel speed of from about 60 to about 500 revolutions per minute usually gives a satisfactory feed rate. It is to be emphasized that the relationships between the face of the regulating wheel and the suture are such that an essentially rolling contact occurs at all points. A feed angle of 14° gives very good results. For a feed angle of 14° and a medium size suture it is desirable to dress the surface of the regulating wheel by dropping the angle to 12° and then dressing with a diamond which follows the axis of the suture grinding throat. This can be readily accomplished by backing off the grinding wheel to leave room for the diamond to cut. This cuts a hyperboloid of revolution with a 12° angle on the grinding wheel. Then when it is elevated to 14°, there is a 2° difference which tends to cut a hyperboloid of revolution on the suture as it passes through the grinding throat and gives a lesser rate of grinding and hence a smoother grind at the exit of the grinding throat and still give a comparatively close to theoretical relationship between the rolling contact of the suture and the regulating wheel. From the theoretical aspects of descriptive geometry and from gear theory, it can be seen that factually there is a tendency towards a hyperboloid of revolution rather than a true frustoconical surface on both the regulating wheel and the suture as it is ground. Because of the rapid rate of size reduction on the suture a small variation from theoretically perfect contact is compensated by the action of the grinding wheel and satisfactory results are obtained. The farther from theoretical the feed relationships, the more likely is the grinding operation to give the three lobed rather than circular configuration to the suture. It is to be noted that whereas FIGURE 8 shows the complete three lobed structure in operation the suture may be ground to have different arcs of curvature so as to give in effect a cross between the three lobed structure and a completely round structure.

The offset angle is illustrated at approximately 35°. An angle of 30° to 40° for a 0.003 to 0.005 reduction gives good results with a 3-0 size suture. A horizontal offset angle of around 10° to 20° gives approximately the same reduction on a size 3 catgut suture whereas an angle of up to almost 60° may be used to a smaller size such as 5-0 or 6-0 sutures.

Whereas the figures are given as illustrative it is to be noted that the angles may vary from these if the reduction in size of the suture through the grinding throat is to be greater or less.

It is desired that in each instance the largest suture be ground from a rough incoming suture because first the larger sizes are frequently preferred and primarily if too much is ground off, one of the plys of catgut forming the suture may be completely severed resulting in fraying. On the other hand the size reduction must be such that the suture along its entire length is reduced to a diameter which is not greater than approximately the same as the minimum diameter on the starting suture in order that the diameter will be uniform throughout. Usually a size is selected which brings the suture into conformity with a standard size of suture. In the United States this is, of course, the size set forth in the U.S. Pharmacopeia. In other countries sutures may be ground to other sizes to meet standards set by appropriate regulatory bodies.

From the above description it can be seen that the exact configuration can be varied somewhat depending upon the size of the suture that is to be ground. If a machine is to be used for grinding only a single size of suture, the angle may be built into the machine. If it is to be used for a plurality of sizes it is more desirable that the machine be adjustable to permit varied angles in the offset angle, the feed angle and the face angle on the grinding wheel.

In the description certain methods are given for the positioning of the grinding wheel. It is to be understood that a different type of cross slide action and adjustment for height, angle and fine feed may be used on both the grinding and regulating wheel where design considerations or available parts render such different construction advantageous at a particular location. Adjustability of the angle and position of the grinding spindle and regulating spindle is disclosed. For special cases, where such great flexibility is not neded some of the features of adjustment may be eliminated. If only one size or type of suture is to be ground, of course the same flexibility of adjustment must be considered against the cost and complexity of full adjustability. Such elimination of adjustability and function is within the scope of the appended claims.

In accordance with conventional practice, when coolant or liquid sprays are used it is quite customary to place a shield over the grinding area to prevent the coolant being thrown around the room. The shield is not shown, as it would block the view of operating elements. Stainless steel can both prevent spray into the room, and furnish protection if a wheel explodes. Such shields are conventional. The shields may even have a transparent portion to permit inspection of the grinding itself.

Having described certain embodiments thereof the scope of the present invention is to be that set forth in the accompanying claims.

We claim:

1. A centerless grinding apparatus comprising: a substantially cylindrical grinding wheel, a substantially frustoconical to hyperboloid of revolution shaped regulating wheel adjacent to and spaced from said grinding wheel, the axis of said regulating wheel having an offset angle of about 10° to about 60° and a feed angle of about 5° to about 15°, with respect to said grinding wheel, the gap between forming a tapered grinding throat, a workpiece support below, extending towards said throat, and forming the bottom thereof, said throat having an exit diameter the size of the desired finished workpiece, said throat having an entrance diameter larger than the exit diameter of the throat, and adapted to receive a feed workpiece, the regulating wheel having such spacing positioning and shape as to have essentially rolling contact with the workpiece at all positions along said throat, and avoiding the introduction of internal twisting in the workpiece.

2. The apparatus of claim 1 having means to direct a cleaning liquid under pressure against the face of the grinding wheel adjacent to the grinding throat, as the wheel comes out of the throat, and wash off ground material; and means to direct a coolant stream of liquid onto the grinding wheel as it approaches the grinding throat thus preventing local overheating during grinding.

3. The apparatus of claim 1 having a workpiece feeding means comprising a feeding air injector having a central passage for the workpiece and which injector has spiral passages for air adjacent the Venturi throat, by which the air in the Venturi throat is given a rotary direction, which in turn imparts a rotation to the workpiece, whereby the workpiece is given a high speed rotation prior to entry to the grinding throat, to minimize the twisting required on initial contact with the regulating wheel to bring the workpiece to synchronous surface speed with the regulating wheel.

4. The apparatus of claim 3 having a feed tube feeding a workpiece to the feeding injector, which feed tube is longer than a workpiece to be ground, a receiving tube longer than the workpiece and additionally a takeoff and drying ejector receiving the workpiece from the grinding throat and transferring the workpiece to said receiving tube, and the brake ejector to control the discharge speed of the workpiece from the receiving tube.

References Cited

UNITED STATES PATENTS

| | | | |
|---|---|---|---|
| 2,059,724 | 11/1936 | Carlson | 51—103 |
| 2,355,907 | 8/1944 | Cox | 51—103 |
| 2,794,304 | 6/1957 | Frankiewicz et al. | 51—103 X |
| 3,066,452 | 12/1962 | Bott et al. | 51—88 |
| 3,154,891 | 11/1964 | Weisgerber | 51—103 |

LESTER M. SWINGLE, *Primary Examiner.*